March 8, 1949.                    D. W. YOUNG                    2,463,585
                    ANGLE OF ATTACK AND YAW INDICATOR
Filed Oct. 10, 1946        AND CONTROL MECHANISM        2 Sheets-Sheet 1
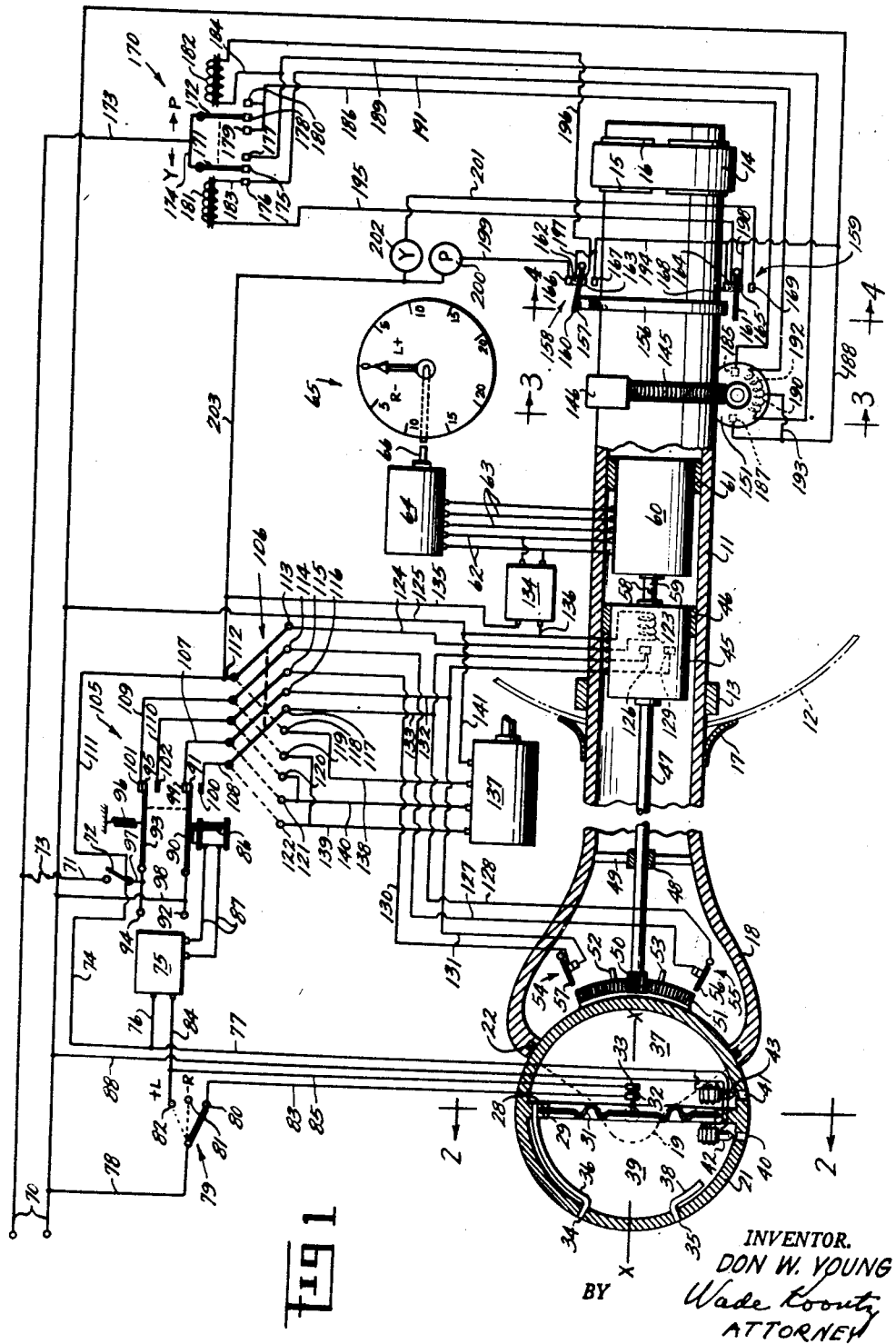
INVENTOR.
DON W. YOUNG
BY
*Wade Koontz*
ATTORNEY
*H. N. Louks*
AGENT March 8, 1949.
D. W. YOUNG
2,463,585
ANGLE OF ATTACK AND YAW INDICATOR
AND CONTROL MECHANISM
Filed Oct. 10, 1946
2 Sheets-Sheet 2
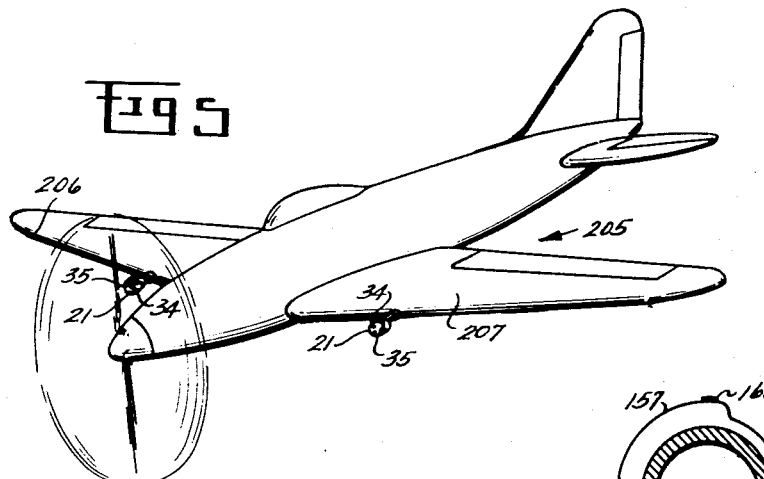
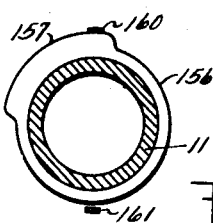
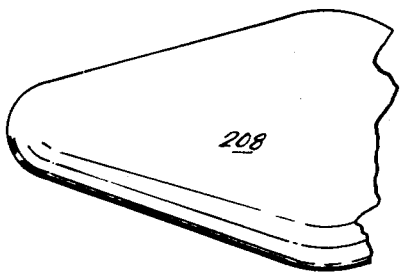
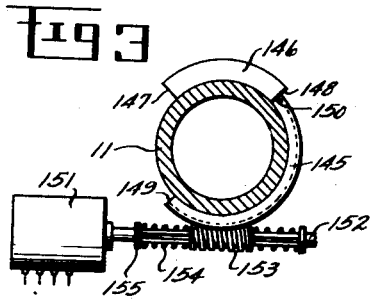
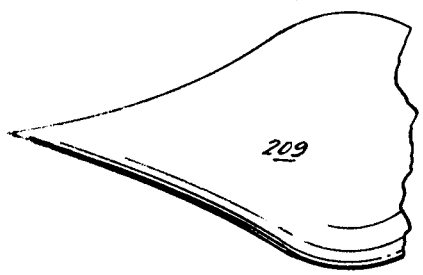
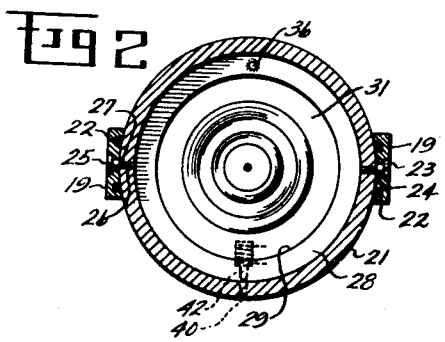
INVENTOR.
DON W. YOUNG
BY Wade Koontz
ATTORNEY
H. H. Losche
AGENT Patented Mar. 8, 1949

2,463,585

UNITED STATES PATENT OFFICE 2,463,585

ANGLE OF ATTACK AND YAW INDICATOR AND CONTROL MECHANISM

Don W. Young, Dayton, Ohio

Application October 10, 1946, Serial No. 702,352

15 Claims. (Cl. 318—489)

(Granted under the act of March 3, 1883, as amended April 30, 1928; 370 O. G. 757)

The invention described herein may be manufactured and used by or for the Government for governmental purposes without the payment to me of any royalty thereon.

This invention relates to an aircraft pitch and yaw angle responsive device that utilizes energy from the relative air stream operative on differential pressure responsive electrical means to effect actuation of angle indicating means and aircraft stabilization control means in at least one of the axes of rotation of the aircraft with respect to the relative air stream.

One of the principal ways of controlling the attack angle of an aircraft in flight is by gyroscopic means. This method has a disadvantage in that it is necessary to manually or automatically keep the instrument caged to correct for gyroscopic precession. Further, a gyro automatic pilot controls the attitude of the aircraft which is the angle relative to the earth's axis. It is well understood that the greatest efficiency in flying is achieved when the pitch angle with respect to the relative air stream, and not with respect to the earth's axis, is maintained within proper limits. As a result, devices have been produced for aircraft utilizing the air stream basically to control the aircraft and to give an indication of these angles with respect to that air stream.

One such prior device utilizes the pressure differential between two pressure transmitting ports in opposed surfaces of an aircraft, or some device on the aircraft for the purpose, that is transmitted through relatively long tubing to fluid motor means, or the like, to operate aircraft stabilization and control means. The sensitivity of these types of devices is poor by reasons of long lengths of tubing through which the air pressure must be transmitted and friction between the sensing element and the controlling elements which causes time lag and hunting.

Another prior device using the air stream to indicate the position of an aircraft relative to the air stream is the vane type meter in which a vane is positioned in the air stream in parallel relation thereto such that it will be balanced on both sides against deflection. In the event the aircraft carrying the device deviates from its straight line position in the air stream one side of the vane will be subjected to a greater pressure than the other side and the vane will seek its position of equilibrium. It effects movement through shafting, gearing, and self-synchronous motors to operate attack or yaw angle indicating means. The vane type meter, while in wide usage, is not capable of a very high degree of accuracy due to frictional losses in gearing before and after transmission with the self-synchronous motor transmitting means.

According to the present invention the objection of such devices used for automatic pilots and/or pitch and yaw angle indicators are overcome in that this device is highly sensitive and accurate for aircraft flight controlling and indication. In accordance with this invention a highly sensitive differential pressure responsive electric switch means is acted on directly by the air from the air stream to control aircraft electric actuating means. A slight deviation of the aircraft from it straight line position will cause a pressure differential to operate the switch. An indicator associated with the aircraft electric actuating means registers the angle deviation between the longitudinal reference line of the aircraft and the relative air stream. This device has a definite advantage over other known devices utilizing the differential pressure obtained from the air stream to actuate fluid motor means for operating stabilization control means and indicating means since the differential pressure is used to directly operate the pressure responsive electric switch which controls the motive power for effecting the stabilization and indication of the aircraft. Thus, by eliminating friction between the sensing element and the controlling elements the sensitivity has been greatly increased.

The maximum range of an aircraft is dependent upon the value of the lift to drag ratio at the angle of attack at which the aircraft is flying and the fuel consumption of the engines at the speed to this angle of attack. The angle of attack for the best lift to drag ratio and the angle of attack for the best engine economy do not always occur at the same angle of attack although it is usually desirable to fly at an angle of attack close to that for maximum lift to drag ratio to obtain maximum range. It is feasible to use the device of the present invention to cause the aircraft to always fly at the most efficient angle of attack where maximum range is the most important factor.

The device of the present invention is also highly useful in the case of landing of an aircraft where it is most desirable to control the angle of the aircraft with respect to the relative air stream and not with respect to the earth's axis since the relative air stream is changing with descent.

By using two of these devices, one responsive to the angle of attack and one response to the angle of yaw, flight control in both lateral and vertical axes can be accomplished. This may be consummated by manually controlling the pitch and yaw angle heads to the desirable angle and selecting the circuit to include proper motors in the flight control system. That is, the device responsive to the angle of attack will operate flight control motors for positioning the aircraft vertical controls; while the device responsive to yaw angles will operate flight control motors positioning the aircraft lateral controls. The adaptation of this device for flight control is also quite useful for guided missiles, or the like, in which case the indicating means could be eliminated.

This device is highly sensitive, accurate, rapid, and simple in operation having only electrical conductors connecting the several elements. Accuracy of the order of ±.1 degree is possible with this device which, to date, is not believed to be possible in other known types. This device can withstand rough use in service and is easily de-iced since all delicate parts are protected.

It is a primary object of this invention to provide a device for aircraft that utilizes the relative air stream to effect operation of electric circuit controlling means.

It is another object of this invention to provide a device that utilizes the relative air stream to actuate electric responsive means adaptable to control the aircraft in flight about one of its axes of rotation and to control attitude indicating means.

Another object of this invention is the provision of a device for aircraft that utilizes the relative air stream to effect stabilization of the aircraft in at least one of its axes of motion and to indicate the angle between the longitudinal reference line of the aircraft in flight and the relative air stream in that axis of motion.

A further object of this invention is to provide a device for aircraft in which a rotatable head member mounted on the aircraft in free air stream position has two ports in a plane normal to the axis of rotation thereof wherein air pressure transmitted through the ports in accordance with a departure from a balanced head setting with respect to the air stream actuates pressure responsive means that is adaptable to simultaneously control the rotation of the head member to the balanced head setting and an attitude indicating means, or to control the flight control system of the aircraft in one axis of motion.

Still another object of this invention is the provision of a device for controlling an aircraft about at least one of its axes of motion thereof and for indicating the attitude about this axis of motion comprising a hollow head member rotatably mounted on an axis on a support extending outwardly with its longitudinal centerline parallel to the longitudinal reference line of the aircraft and in free air stream position; the head member having two pressure ports arranged in a plane perpendicular to the axis of rotation thereof and normally in a position symmetrical to the longitudinal centerline of the support for transmitting air pressure to opposed sides of an enclosed highly sensitive differential pressure responsive electric switch; the pressure responsive electric switch controlling an electronic relay switch operable to simultaneously control electric motor means for rotating the hollow head member and an attitude angle indicating means, or to control electric motor means for stabilizing the aircraft to maintain the hollow head member in a balanced position in which equal pressure is transmitted in the pressure ports; circuit breakers on the rotatable hollow head member to disconnect the electric motor means upon rotation of the head member to either of its rotative limits; and reversible electric motor means for rotating the support through 90 degrees about its longitudinal centerline with limit switches for breaking the circuit at the end of this rotation in either direction and for energizing indicating lamps wherein the positioning of the ports in a plane normal to the lateral axis of the aircraft will adapt the device for functioning according to the angle of attack and the positioning of the ports in a plane normal to the vertical axis of the aircraft will adapt the device to function in accordance to the angle of yaw.

Other objects and advantages will become apparent as the description proceeds taken in conjunction with the accompanying drawings, in which:

Fig. 1 is a view of the air operated aircraft attitude device shown partly in cross-section with cooperating elements and circuits diagrammatically illustrated;

Fig. 2 is a cross-section taken on the line 2—2 of Fig. 1 looking in the direction of the arrows;

Fig. 3 is a cross-section taken on the line 3—3 of Fig. 1 looking in the direction of the arrows;

Fig. 4 is a cross-section taken on the line 4—4 of Fig. 1 looking in the direction of the arrows;

Fig. 5 is an aircraft showing the use of the device for lateral and vertical flight control;

Fig. 6 shows a broken away view of a modified head member; and

Fig. 7 shows a broken away view of another modification of a head member.

Referring to Fig. 1 for describing the device more in detail a tubular support member 11 extends through the forepart of an airfoil 12 of an aircraft, shown in phantom. The tubular support 11 is supported to partly project from the airfoil and to be rotatively journalled within the airfoil on two bearings 13 and 14. The bearings 13 and 14 are fixed to the structure of the airfoil and held against endwise movement by snap-rings 15 and 16 inserted in grooves in the tubular support member 11 in abutting relation with opposite sides of the inner bearing 14. A resilient sealing member 17 is attached to the tubular support 11 at its junction with the airfoil 12 and is flared outwardly to sealingly engage the airfoil 12 to prevent exposure of the mechanical parts of the device to the weather. The support 11 is mounted in the airfoil such that its longitudinal centerline is parallel to the longitudinal reference line of the aircraft (not shown).

The outer end of the tubular support 11 is enlarged in a bell-shape portion 18 which is preferably faired with a head member 21. The bell-shaped portion 18 has two outwardly extending projections 19 which act as supporting pivots for the head member 21 that is rotatively sealed against the weather by a sealing strip 22 seated within a continuous groove about the periphery of the bell-shaped portion 18. The head member 21 is journalled in the projections 19 (shown in Fig. 2) as by oppositely disposed screws 23 rotatably fitting in openings 24 in the projections 19. Each of the screws 23 has an enlarged shaft portion extending from the screw head to a shoulder 25 that engages the head member 21 upon the threaded portion 26 thereof being screw threaded into the threaded openings 27 of the head member. This assembly allows a snug fit but free rotation of the screws 23 in the openings 24 and will be hereinafter referred to as the head member axis of rotation. The head member 21 has a circular rib 28 therein on diametrical axes in the plane of the journal 23, 24 providing a circular opening 29 arranged concentrically therein. The outer periphery of a flexible diaphragm 31 is hermetically sealed in the opening 29 of the circular rib 28 and carries an electrical contact 32 in the center thereof and insulated therefrom. A second electrical contact 33 is insulatingly held by the head member 21 in a position to very lightly contact the electrical contact 32 when the diaphragm is unbiased by any pressure differential on its opposite sides. Equidistantly spaced on opposite sides of an axis of symmetry $x$—$x$, that is perpendicular to the plane of the circular rib 28 and the sphere axis of rotation, are two equal sized pressure ports 34 and 35 arranged in a plane normal to the head member axis of rotation. The pressure port 34 is connected by tube 36 to the rear chamber 37 containing the electrical contacts 32 and 33; while the pressure port 35 is connected by tube 38 to the fore chamber 39 in the head member 21. The contacts 32, 33 are in actual practice sealed in an envelope to protect them from moisture, etc., in the air received in the port 34. The tubes 36 and 38 are preferably of a larger bore than the ports 34 and 35 to avoid any action of flow resistance. Two drain ports 40 and 41 through the head member from chambers 39 and 37, respectively, are controlled by two normally open electrically operated valves 42 and 43, respectively, such as the electromagnetic type shown, or the like.

Within the tubular support member 11, preferably in the portion within the confine of the airfoil, is a reversible electric motor 45 having a shaft 47 extending from both ends thereof and supported as by lugs 46. The forward end of the shaft 47 is journalled in a bearing 48 held by a spider 49 attached to the tubular support 11. The shaft 47 has a small pinion gear 50 attached thereto for cooperation with a gear rack 51 attached to the outer surface of the head member 21 that lies within the bell-shaped portion 18 of the tubular support 11. The motor 45 is operative to rotate the head member on its journals 23, 24 through an arc of predetermined length. The gear rack 51 has outstanding pins 52 and 53 thereon operative to open normally closed limit switches 54 and 55 when the motor 45 rotates the head member 21 a predetermined amount in either direction sufficient for the pin 52 or 53 to strike one of the contact carrying elements 57 or 56, respectively, to break the circuit through the respective limit switch for the purpose later to be described. Where desirable, a gear reduction means may be used in substitution for the gears 50, 51 where considered advisable or advantageous.

The rear or right hand end of the shaft 47 is joined, as by a detachable coupling 58, to a shaft 59 of a transmitter self-synchronous motor 60 of a self-synchronous system that is supported in the tubular support member 11 by lugs 61. The self-synchronous transmitter motor 60 is electrically connected in a well known manner by rotor and stator leads 62 and 63 to a repeater receiver self-synchronous motor 64.

The receiver motor 64 operates an indicator 65 through a shaft 66. The indicator 65 is initially set to register 0 when the axis of symmetry $x$—$x$ of the head member 21 is parallel to the longitudinal center line of the tubular support member 11 and likewise parallel to the longitudinal reference line of the aircraft carrying the device. The indicator 65 will register the degrees deviation of the axis of symmetry $x$—$x$ of the head member 21 with respect to the longitudinal center line of the tubular support member 11.

The current supply for the operation of the above-mentioned electrical elements may be taken directly from the D. C. supply of the aircraft herein shown as the leads 70. A conductor 71 from the positive lead 70 connects a master switch 72 through the fuse 73. A conductor 74 from the master switch leads to an electronic relay 75 by a conductor 76 and to the positive terminal of the electrically operated valves 42 and 43 through the conductor 77. A conductor 78 from the negative lead 70 is connected to a switch 79 adaptable to be connected to contact 80, 81 or 82. The contact 80 is connected through the conductor 83 to the contact 32 in the head member 21, the contact 81 is a dead pole for off position, and the contact 82 is connected at the negative terminal of the electronic relay 75 through the conductor 84. A conductor 85 connects the contact 33 in the head member 21 with the negative pole of the electronic relay 75, which may be by way of the conductor 84 as shown, if desirable. The electronic relay includes an electromagnet 86 connected by leads 87 which in actual practice is incorporated within the electronic relay unit. By this circuit arrangement, it may be seen that with the master switch 72 closed, the switch 79 may be positioned on the contact 81 in which the electromagnet 86 is unenergized, positioned on the contact 82 to energize the electromagnet 86, or positioned on the contact 80 to place the energization of the electromagnet 86 under the control of the contacts 32, 33. A conductor 88 connecting the negative lead 70 with the negative pole of the electrically operated valves 42 and 43 completes the circuit through the electrical actuator of these valves to close them whenever the master switch 72 is closed.

The electromagnet 86 is arranged in a cooperative relationship with an armature 90 constituting a conducting arm with an oppositely faced contact 91 thereon and being pivoted at 92. A similar arm 93 pivoted at 94 has an oppositely faced contact 95 thereon and is electrically non-conductively connected by an insulator to the arm 90 such that the two arms will operate together. The arms 90 and 93 are biased away from the electromagnet 86 by a spring 96. A conductor 97 connects the service side of the master switch 72 with the contact 95 through the arm 93 and a conductor 98 connects the contact 91 with the negative lead line 70 through the arm 90. The contact 91 is operative between two contacts 99 and 100, and the contact 95 is operative between two contacts 101 and 102. The contacts 91, 95, 99—102 constitute a reversing switch referred to generally by the reference character 105.

The four contacts 99, 100, 101 and 102 connect four contact arms of a five pole double throw selective switch, generally designated as 106, through conductors 107, 108, and 109 and 110, respectively. The fifth contact arm of the selective switch 106 is connected to the service side of the master switch 72 by the conductors 111 and 112.

The contact arms of the selective switch 106 operate as a gang to engage the set of contacts 113, 114, 115, 116, and 117, or to engage the set of contacts 118, 119, 120, 121, and 122. Contact 113 connects one terminal of the field coil 123 through the conductor 124 and the other terminal of the field coil 123 is connected to the negative lead 70 through the conductor 125. The contact 114 connects a commutator brush 126 through the conductor 127, contacts of limit switch 55, and conductor 128; the contact 115 connects the commutator brush 129 through conductor 130, limit switch 54, and conductor 131; the contact 116 connects the conductor 131 through the conductor 132; and the contact 117 connects the conductor 128 through the conductor 133. The rotor leads 62 of the self-synchronous motor systems are connected through a D. C. to A. C. inverter 134 to the conductor 111 and the conductor 125 through conductors 135 and 136, respectively, for obtaining line voltage through the master switch 72.

The contacts 118—122 are connected to a reversible electric motor 137, for actuating controlling surface of the aircraft, through conductors 138, 139, 140, and 141, the field circuit being completed through the conductors 138 and 141 and the armature circuit being completed through the conductors 139 and 140 in like manner as the circuit for motor 45. Limit switches may be included in the armature circuits operating from the controlling surfaces of the aircraft, where desirable. Further, the conductors 138—141 may connect more than one motor 137 where necessary to operate coordinating control surfaces of the aircraft.

As formerly described, the tubular support member 11 is rotatable in the bearings 13 and 14. A sector ring gear 145 is detachably connected to the tubular support 11 in any well known manner, as by bolting, to facilitate assembly of the device in an aircraft. A circular sector member 146 is attached to the structure of the aircraft airfoil and provides a stop for the tubular member 11 in either rotative direction by reason of the ends 147 and 148 of the circular sector member 146 being engageable with the ends 149 and 150, respectively, of the sector ring gear 145 (see Fig. 3). A motor 151 has a splined shaft 152 for slidably receiving a worm gear 153 keyed thereon. The worm gear 153 is resiliently held in a central position on the splined shaft by compression springs 154 anchored to the splined motor shaft 152 by snap fastening locking rings 155, or the like, in a well known manner. The motor 151 is secured to the structure of the airfoil such that the worm gear 153 meshes with the sector ring gear 145.

Referring to Figs. 1 and 4, a cam ring 156 is bolted or otherwise secured to the tubular support 11, as shown, and has a raised cam portion 157 on the periphery thereof. Two limit switches 158 and 159 in fixed relation to the structure of the airfoil have pivoted arms 160 and 161 of electrical insulating material, adapted to be engaged by the raised portion 157 of the cam ring 156. Each arm 160 and 161 have oppositely disposed contacts 162, 163 and 164, 165 electrically insulated from each other. The contact 162 cooperates with a contact 166; contact 163 cooperates with a contact 167; contact 164 cooperates with a contact 168; and contact 165 cooperates with a contact 169 in a manner hereinafter described. The raised portion 157 of the cam ring 156 and the limit switches 158 and 159 are so positioned that the limit switch 158 is actuated by the cam portion 157 just prior to the end 150 of the sector ring gear 145 coming into engagement with the end stop 148 of the semicircular member 146 and the limit switch 159 is actuated by the cam portion 157 just prior to the end 149 coming into engagement with the end stop 147.

The motor 151 is in a circuit controlled by a yaw-pitch selector switch 170 which may be a double pole-double throw type switch having a pair of knife blades 171, 172 electrically connected to the positive line 70 by the leads 173 and 174. The knife blade 171 carries a double faced contact 175 operative with contacts 176 and 177. The knife blade 172 has a double faced contact 178 thereon operative with contacts 179 and 180. The knife blades 171 and 172 are normally biased to a neutral position in which the contacts 175 and 178 are intermediate the contacts 176, 177 and 179, 180, respectively. Electromagnets 181 and 182 are placed on opposite sides of the knife blade 171 and 172 for holding, when energized, the contacts 175 and 178 against one or the other pair of cooperative contacts. The electromagnet 181 has one of its terminals 183 connected to the contact 176 and the electromagnet 182 has one of its terminals 184 connected to the contact 177. One commutator brush 185 of the motor 151 is connected to the contacts 179 and 180 by the conductor 186 and the other brush 187 is connected to the negative lead 70 by a conductor 188. Contact 177 is connected through the conductor 189 to the field coil 190 for causing motor rotation in a direction to rotate the tubular support 11 clockwise as seen in Fig. 3; and contact 176 is connected through conductor 191 to field coil 192 for rotating the motor 151 in a direction to turn the tubular support 11 counterclockwise, as viewed in Fig. 3. The field coils 190 and 192 have a common lead 193 to the negative lead 70 through the conductor 188. A conductor 194 connects the contacts 167 and 168 of the limit switches to the negative lead 70 through the conductor 188. A terminal of the electromagnet 181 is connected to the contact 164 of the limit switch 159 by conductor 195; and a terminal of the electromagnet 182 is connected to the contact 163 through the conductor 196. Contacts 162 and 165 are connected to the negative lead 70 by the conductors 197 and 198, respectively, through the conductors 194 and 188. The contact 166 is connected by a conductor 199 to a terminal of a signal lamp 200 and the contact 169 is connected by a conductor 201 to a terminal of a signal lamp 202. The other terminals of the signal lamps 200 and 202 are connected to the service side of the master switch 72 by conductors 111 and 203.

In operation, when the pilot desires to have the device function as an indicator alone, the switch 79 is placed on the contact 80 as shown by the continuous line and the selective switch 106 is thrown as shown by the unbroken lines. The head member 21 is in a position with the ports 34 and 35 in a plane normal to the horizontal axis of the aircraft which conditions the device responsive to the angles of pitch. The master switch 72 is then thrown closed which energizes the two drain valves 42 and 43 to close the drain ports 40 and 41. Let it be assumed that the aircraft is in flight on a level course and the axis of symmetry $x-x$ is parallel to the horizontal centerline of the tubular support 11 when the master switch 72 is thrown closed. Due to the angle of attack of the aircraft, a greater pressure will be set up in chamber 39 than in chamber 37 which will close contacts 32, 33 energizing the electromagnet 86 pulling the arms 90 and 93 downward. Current will then flow through master switch 72 from the positive lead 70, conductor 97, arm 93, contacts 95 and 102, conductor 110, contact 115, conductor 130, safety switch 54, conductor 131, contact brushes 129 and 126, conductors 128 and 133, contact 117, conductor 108, contacts 100 and 91, arm 90, and conductor 98 to the negative lead 70. The field circuit is established through the master switch 72, conductors 111 and 112, contact 113, conductor 124, field coil 123, and conductor 125 to the negative lead 70. This circuit causes the motor to operate to rotate the head member 21 counterclockwise. Rotation of the shaft 47 to rotate the head member 21 will rotate the rotor of the transmitter self-synchronous motor 60. The repeater receiver self-synchronous motor 64 follows the transmitter motor 60 and simultaneously turns the hand on the dial to register the degrees+ that the longitudinal reference line of the aircraft is with the axis of symmetry $x$—$x$ of the head member 21. The rotors of the self-synchronous motor system receive operating current through the conductors 111, 135 and conductors 125, 136 to the rotor leads 62. The inverter 134 is used to supply the self-synchronous motor system with A. C. voltage as required for proper operation.

Upon the head member 21 rotating counter-clockwise until the pressure in chamber 37 slightly exceeds the pressure in chamber 39, the contacts 32, 33 will be separated and the electromagnet 86 de-energized. Thus a circuit is set up through the master switch 72, conductor 97, arm 93, contacts 95, 101, conductor 109, contact 114, conductor 127, safety switch 55, conductor 128, contact brushes 126, 129, conductors 131, 132, contact 116, conductor 107, contacts 99, 91, arm 90, and conductor 98 to the negative lead 70 to rotate the motor 45 in a direction to rotate the head member 21 in a clockwise direction. The circuit through the field coil 123 of the motor 45 has remained unchanged. The degrees of the longitudinal reference line of the aircraft with respect to the axis of symmetry $x$—$x$ will be registered on the indicator 65.

The diaphragm operated switch 32, 33 is highly sensitive to the pressure differential of the two chambers 37 and 39 such that when the axis of symmetry is operating substantially parallel to the air stream, the contacts will make and break causing the motor 45 to rotate very slightly counterclockwise and clockwise which in effect is an oscillatory action to maintain the axis of symmetry $x$—$x$ parallel to the air stream. The oscillatory motion, however, is so slight, due to the high sensitivity of the diaphragm switch 32, 33, that such motion is not noticeable on the indicator 65. Where desirable, a cycling interrupter switch may be placed in the motor circuit, capable of interrupting the circuit in the order of about 100 to 200 times per minute, to dampen the oscillatory action of the motor and thus increase the sensitivity of the system in a manner well known in the art.

In the above example a circuit is effective through conductors 111, 203, lamp 200, conductor 199, contacts 166, 162 and conductors 197, 194, 188 to light the lamp 200 which designates by P, or the like, that the device is operating to register the angle of pitch.

When the pilot desires to get a registration of the angle of yaw, it is only necessary to press a button of a yaw-pitch selective switch properly indicated for the purpose shown diagrammatically at 170 to swing the arms 171 and 172 to the left. A circuit will be completed from the positive lead 70, conductors 173, 174, arm 171, contacts 175, 176, conductor 183, electromagnet 181, conductor 195, contacts 164, 168, and conductors 194, 188, to the negative leads 70 to effect a holding circuit until the motor 151 has rotated the tubular support 11 through 90 degrees to condition the head member 21 to operate in accordance with the yaw angle. The circuit through the motor 151 is effected by the current from the positive lead 70 to the contact 176 as heretofore described, conductor 191, field coil 192 and conductors 193, 188 to the negative lead 70; and simultaneously a circuit is established from the positive lead 70, conductors 173, 174, arm 172, contacts 178, 179, conductor 186, contact brushes 185, 187, and conductor 188 to the negative lead 70 to cause the motor 151 to operate to rotate the tubular support clockwise, looking in the direction of the arrows 3—3 of Fig. 3. Slightly prior to the end 149 of the sector ring gear 145 engaging the stop end 147, the cam portion 157 will engage the arm 161 to disconnect the contacts 164, 168 to break the holding circuit through the electromagnet 181 and bring the contacts 165, 169 together to light the yaw lamp 202 by a circuit established from the master switch 72, conductor 203, lamp 202, conductor 201, contacts 169, 165, and conductors 198, 194, 188 to the negative lead 70. Upon the holding circuit through the electromagnet 181 being broken, the inertia of the armature of motor 145 brings the end 149 in tight engagement with the end 147 and any further rotation of the motor armature is absorbed in the spring 154, the worm gear 153 being permitted to slide on the splined shaft 152. The head member 21 is now positioned with the plane of the ports 34, 35 lying normal to the vertical axis of the aircraft and the device is operating in the same manner as described above for registering the angle of pitch except that the angle registered now is that of yaw, as shown by the lamp 202, to the right or left as may be identified by R and L on the indicator dial. Since the head member 21 always seeks to maintain the axis of symmetry $x$—$x$ parallel to the air stream through the circuit arrangement to the controlling motor 45, the indicator 65 will register the angle of the axis of symmetry $x$—$x$ with respect to the longitudinal centerline of the tubular support 11, which is parallel to the longitudinal reference line of aircraft, through the operation of the self-synchronous motor system 60, 64. In the event the head member 21 tries to rotate an exceptional amount, as when the aircraft goes into a spin, or is on the ground with the master switch left on, etc., the limit switches 54, 55 will break the circuit to avoid damage to the device.

By a particular switching arrangement, the air operated device may be used to automatically control the aircraft in one of its axes of motion. This is accomplished by manipulating the switches 72, 79 and 106 in the proper manner. Let it be assumed that the pilot wishes the air operated device to control the aircraft in accordance with the angle of pitch. If the device is left in the position to register the yaw angle as described in the above example of operation, it is merely necessary to momentarily depress the button marked P of the yaw-pitch selective switch 170 and the motor 151 will operate to turn the tubular support 11 counterclockwise, as viewed in Fig. 3, the limit switch 158 being operative to break the holding circuit through the electromagnet 182 breaking the circuit to the motor 151 and simultaneously making a circuit to light the lamp 200 upon the ends 148, 150 coming into engagement. The disengagement of the cam portion 157 from the safety switch 159 reconditions the motor circuit for operation when the Y button is again pressed and breaks the circuit to the lamp 202. If the angle of pitch, as registered on the dial of the indicator 65, is not desirable the pilot may throw the switch arm 79 to the contact 81 or 82, as shown in broken lines, to rotate the head member 21 in a direction to bring it to the desired pitch angle as registered on the indicator 65. It may be seen that by placing the switch 79 to the contact 81, the electromagnet 86 is unenergized and the motor 45 is in an active circuit to rotate the head member 21 clockwise; while by placing the switch 79 to the contact 82 will energize the electromagnet 86 from the master switch 72, conductors 74, 76, electronic relay 75, conductor 84, contact 82, and conductor 78 to the negative lead 70 to cause the motor 45 to rotate the head member 21 counterclockwise. When the desirable pitch angle is reached, the master switch 72 is opened and selector switch 106 thrown to the position shown in dotted lines which places the motor, or motors, 137 in the circuit for actuating the aircraft vertical control surfaces. The switch 79 is then replaced to connect the contact 80 placing the diaphragm switch 32, 33 back in the control of the motor circuit.

With the switch 79 replaced to the contact 80 and the selector switch 106 thrown as shown in broken lines, the master switch 72 is again closed and the diaphragm activated switch 32, 33 will control the motor, or motors, 137 in accordance with the angle of pitch as registered on the indicator 65 with respect to the air stream through the motor leads 138, 139, 140 and 141 in the same manner as the motor 45 was operated. However, now the head member 21 and indicator 65 remain motionless and the aircraft, controlled by the motor or motors 137, flies at the angle of attack as registered on the indicator 65. One skillful in handling electrical switches may effect the above desirable position without operating master switch 72.

By arranging proper switches in the leads 138—141 a motor for the lateral and directional control could be placed in the motor circuit and the air operated device positioned for operation in accordance with the angle of yaw.

From the foregoing description, it should be apparent that the air operated device is highly sensitive and accurate in its operation to provide control with respect to the relative air stream. A constant registration of either the angle of pitch or yaw may be obtained with the single device and, where desirable, the device may be used to automatically control the aircraft in one of its axes of motion.

Where it is desirable to obtain indication and control of the aircraft in both of its lateral and vertical axes of motion two such devices may be used on the aircraft as shown in Fig. 5 wherein the aircraft generally referred to by the reference character 205 has the air operated device hereintofore described in each airfoil section 206 and 207. As illustrated, the air operated device in the airfoil section 206 has the head member 21 positioned such that the pressure ports 34, 35 are in a plane parallel to the horizontal reference line of the aircraft; while the head member 21 on the airfoil 207 has the pressure ports 34 and 35 positioned parallel to the vertical reference line of the aircraft 205. The air operated device in the airfoil 206 will function in accordance with the angle of yaw to control the aircraft as selected by the selective switch 106 in that system; and the air operated device in the airfoil 207 will function in accordance with the angle of pitch to control the aircraft and indicator 65 as selected by the selector switch 106 of its system. In this manner, automatic flight control about lateral and vertical axes and attitude indication may be effected.

While the head member 21 is shown spherical by way of illustration, heads of other shapes may be used to get the optimum results. For example, the spherical head member 21 may prove most efficient for aircraft built to travel at subsonic speeds, but as aircraft design progresses to achieve transonic and supersonic speeds a change in the design of the head members becomes necessary to obtain optimum aerodynamic conditions. Fig. 6 shows a broken away head member design 208 that would probably be more satisfactory for aircraft designed for transonic speeds; while Fig. 7 shows a broken away head member design 209 probably most adaptable for aircraft designed for supersonic speeds.

Although I have shown a preferred form of my invention, it will be apparent to those skilled in the art that various modifications and changes may be made therein without departing from the spirit and scope of my invention and I desire to be limited only by the scope of the appended claims.

I claim:

1. An air operated device for aircraft comprising, a hollow head member extending in free air stream position from the aircraft, an electrical switch within the said hollow head member operated by a pressure responsive diaphragm, two pressure ports symmetrically arranged in the said hollow head member each fluidly connected to an opposite side of the diaphragm for transmitting pressure from the air stream thereto, and aircraft actuating means electrically controlled by said electrical switch.

2. An air operated device for aircraft comprising, a rotatable head member extending in free air stream position from the aircraft and having differential pressure responsive electrical means therein subjected to air pressure from two pressure ports symmetrically arranged on the said head member, an electrical network having head member and aircraft control surface electrical actuating means therein the said pressure responsive electrical means being operable to control a polarity reversing switch in said electrical network to control the operative direction of the electrical actuating means to maintain equal pressure in said two pressure ports.

3. An air operated device for aircraft comprising, a rotatable hollow head member held in free air stream position by a support on the aircraft and having pressure responsive electrical means therein operative upon differential pressure transmitted thereto from two pressure ports open to the air stream, the said pressure responsive electrical means operative to control a primary circuit electrically related to aircraft flight electric motor controlling means and electric motor means operable to rotate the said hollow head member in a direction to maintain equal pressure in said two pressure ports, and an attitude angle indicating means operatively connected to said hollow head member to register the angular position of said two pressure ports in the airstream with respect to the aircraft.

4. An air operated device for aircraft comprising: a tubular support mounted on an aircraft with the longitudinal center line thereof being parallel to the longitudinal reference line of the said aircraft; a hollow head member mounted on the said tubular support in free air stream position and rotatable about an axis normal to the longitudinal center line of the said tubular support; a differential pressure responsive electric switch within the said hollow head member subjected to opposed pressures from two ports in said hollow head member arranged in a plane perpendicular to the hollow head member axis of rotation; an attitude angle indicating means operatively associated with said hollow head member to register the angle of an axis symmetrical to said two pressure ports of said hollow head member with respect to the longitudinal center line of said tubular support; and selective circuit means operative in one circuit to control a part of the aircraft flight control system, and operative in another circuit to control a hollow head rotating means; said differential pressure responsive electric switch being electrically connected through an electric actuator of a polarity reversing switch in said selective circuit means to exercise directional control over the aircraft flight control system and the hollow head rotating means to orient the tubular support in the airstream in accordance with the angle registered on said attitude angle indicating means.

5. An air operated device for aircraft as set forth in claim 4 wherein the other circuit to control the said hollow head member rotating means includes limit switches to break the circuit upon the said hollow head member reaching a predetermined rotation in either direction.

6. An air operated device for aircraft as set forth in claim 4 wherein the operative association of said attitude angle indicating means and said hollow head member for controlling the said attitude angle indicating means includes a self-synchronous motor-receiver system electrically coupling the said hollow head member rotating means and the said attitude angle indicating means.

7. An air operated device for aircraft comprising: a tubular support mounted on an aircraft with the longitudinal center line thereof being parallel with the longitudinal reference line of the said aircraft and adaptable to be rotated through an arc of 90° about the longitudinal center line as an axis; a hollow head member rotatably mounted on the outer end of said tubular support in free air stream position on an axis normal to the longitudinal center line of the said tubular support; reversible electric motive means for rotating the said hollow head member about its axis; an attitude indicating means coupled to said hollow head member by self-synchronous motor-receiver means to register the angular deviation of said hollow head member with respect to said tubular support; a differential pressure responsive electric switch within the said hollow head member subjected to opposed pressures from two ports through the said hollow head member open to the air stream, said ports being in a plane perpendicular to the hollow head member axis of rotation and symmetrical to an axis of symmetry of the said hollow head member; a selective circuit adaptable to include the said reversible electric motive means; and a relay polarity switch in the said selective circuit having its relay coil electrically connected through said differential pressure responsive electric switch whereby the pressure responsive electric switch controls the rotative direction of said reversible electric motor, and rotation of the said support to one of its limited positions places the ports in a plane perpendicular to the lateral axis of the said aircraft for producing a controlling function in accordance with the angle of attack and upon rotation of the said support to its other limited position places the ports in a plane normal to the vertical axis of the said aircraft for producing a controlling function in accordance with the angle of yaw.

8. An air operated device for aircraft as set forth in claim 7 wherein the circuit for the said reversible electric motive means includes limit switches to break the circuit upon the said hollow head member reaching a predetermined rotative limit.

9. An air operated device for aircraft comprising: a tubular support mounted on an aircraft in free air stream position with the longitudinal center line being parallel to the longitudinal reference line of the said aircraft and rotatable through an arc of 90°; means for rotating the said support and holding it at either of its rotative limits; a hollow head member in free air stream position rotatively mounted on said support on an axis perpendicular to the longitudinal center line thereof such that at one rotative limit of the said support the head member axis of rotation is normal to the vertical axis of the said aircraft and at the other rotative limit of the said support the head member axis of rotation is normal to the lateral axis of the said aircraft; a differential pressure responsive electric switch within the said hollow head member subjected to opposed pressures from the air stream through two ports arranged in a plane perpendicular to the said head member axis of rotation and symmetrical to a head member axis of symmetry; a primary selective circuit adaptable to be placed in operative connection with either of two secondary circuits, one of which includes a reversible electric motive means for rotating the said hollow head member about its axis of rotation and the other of which includes aircraft flight control electric motive actuating means; an attitude angle indicating means operatively associated by a self-synchronous motor-receiver coupling with said hollow head member to indicate the angle of said head member axis of symmetry with respect to said tubular support longitudinal center line; and a relay activated reversing switch means controlling the selective circuit, the relay coil being in operative electrical association with the said differential pressure responsive switch for said differential pressure responsive switch to maintain control thereof such that the electric motive means in either secondary circuit of the said selective circuit will operate to maintain substantially equal pressures in the said ports of the said hollow head member, the position of the said support in its said one rotative limit adapting the device to function in accordance with the angle of attack and in its said other rotative limit the device functions in accordance with the angle of yaw, and the said indicating means registers the respective angle of the axis of symmetry of the said hollow head member with respect to the longitudinal reference line of the said aircraft.

10. An air operated device for aircraft as set forth in claim 9 wherein the said relay activated reversing switch means is an electronic relay reversing switch and the said one secondary circuit includes limits switches constructed and arranged to break the circuit to the said reversible electric motive means upon the said hollow head member reaching a predetermined rotative limit in either rotative direction.

11. An air operated device for aircraft as set forth in claim 9 wherein the said means for rotating the said support is a reversible electric motive means having an operating circuit with limit switches and signal lamps in a signal lamp circuit associated therewith such that upon the support being rotated to either of its positions a limit switch will break the operating circuit and simultaneously light the respective indicating lamp.

12. An air operated device for aircraft as set forth in claim 9 wherein the said one secondary circuit includes limit switches constructed and arranged to break the circuit through the said reversible electric motive means upon the said hollow head member reaching a predetermined rotative limit in either direction; and the said means for rotating the said support is a reversible electric motive means having an operating circuit with limit switches and signal lamps in a signal lamp circuit associated therewith such that upon the support being rotated to either of its positions a limit switch will break the operating circuit and simultaneously energizes the respective indicating lamp to indicate whether the said head member is positioned to operate in accordance with the angle of attack or the angle of yaw.

13. An air operated device for aircraft as set forth in claim 9 wherein the said differential pressure responsive electric switch has a single contact in series with the relay coil of the said relay activated reversing switch means, the said relay activated reversing switch means closing the selective circuit for electric motive operation in one direction when the said relay coil is energized and the said relay activated reversing switch means closing the selective circuit for electric motive operation in another direction when said relay is de-energized.

14. A device for selectively indicating the angle of attack or yaw angle of aircraft in flight with respect to the air stream comprising; a tubular support member mounted on the aircraft with the longitudinal axis thereof parallel with the longitudinal reference line of the said aircraft and being rotatable about the said longitudinal axis for 90°; a hollow head member rotatably mounted on the said tubular support in free air stream position on an axis perpendicular to the said longitudinal axis of the said support and having two pressure ports therein in a plane normal to the axis of rotation thereof communicating with opposed sides of a differential pressure responsive electric switch therein; reversible electric power means constructed and arranged to rotate the said hollow head member about its axis to position the said two pressure ports in the air stream, and to actuate a self-synchronous motor means; a primary electric circuit for the said reversible electric power means with a reversing switch therein; a secondary electric circuit connected through the said pressure responsive electric switch to an electronic relay operative to control the said reversing switch to cause the electric power means to reversibly rotate to maintain equal pressure in the said two pressure ports; an indicator actuated by the self-synchronous motor means for registering the angle of deviation between the reference line of symmetry between the two pressure ports and the longitudinal axis of the said tubular support; and a power means for selectively turning the said tubular support to either of its limits for placing the plane of the said two pressure ports normal to the lateral or vertical axis of the said aircraft with signal means operative to designate whether the said indicator is registering the angle of attack or the angle of yaw.

15. The indicating device as set forth in claim 14 wherein the said primary circuit includes safety switches for breaking the electrical circuit to the said electric power means upon the said hollow head member reaching predetermined limits of rotation.

DON W. YOUNG.

REFERENCES CITED

The following references are of record in the file of this patent:

UNITED STATES PATENTS

| Number | Name | Date |
|---|---|---|
| 2,016,857 | Fischel | Oct. 8, 1935 |
| 2,104,972 | Cunningham | Jan. 11, 1938 |
| 2,237,306 | Hood | Apr. 8, 1941 |
| 2,413,739 | White | Jan. 7, 1947 |

FOREIGN PATENTS

| Number | Country | Date |
|---|---|---|
| 204,138 | Great Britain | Sept. 26, 1923 |